(No Model.) 3 Sheets—Sheet 3.
F. FILIP.
APPARATUS FOR MOLDING VENEER ARTICLES.
No. 528,663. Patented Nov. 6, 1894.
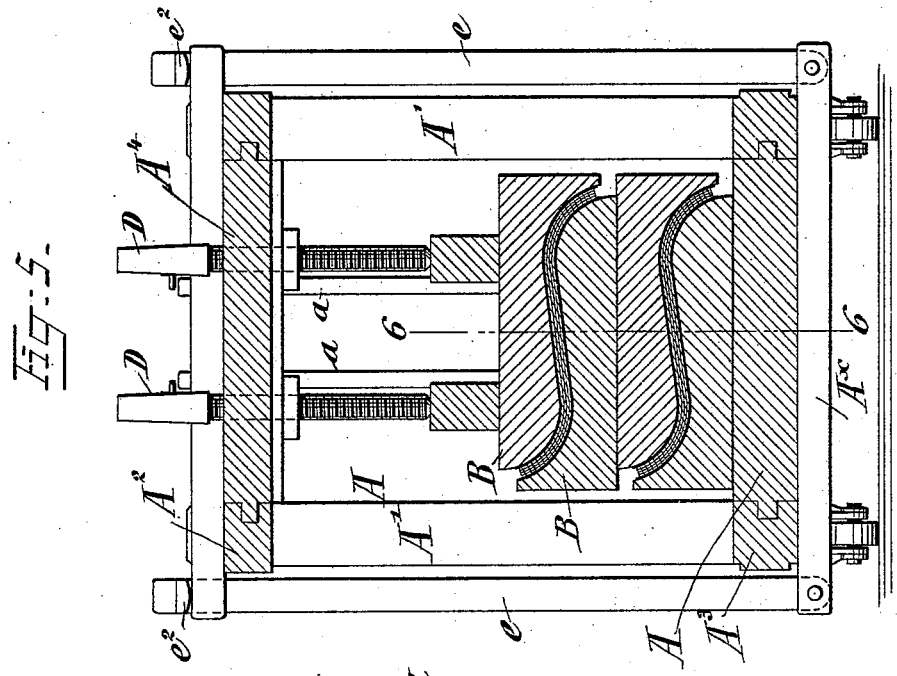
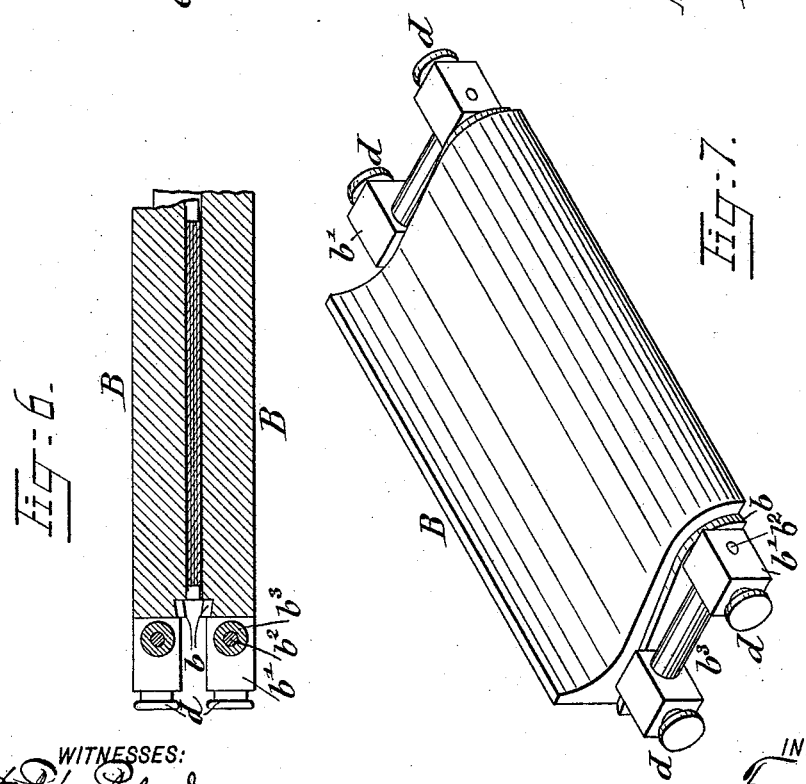
WITNESSES:
INVENTOR
Franz Filip
BY
ATTORNEYS.

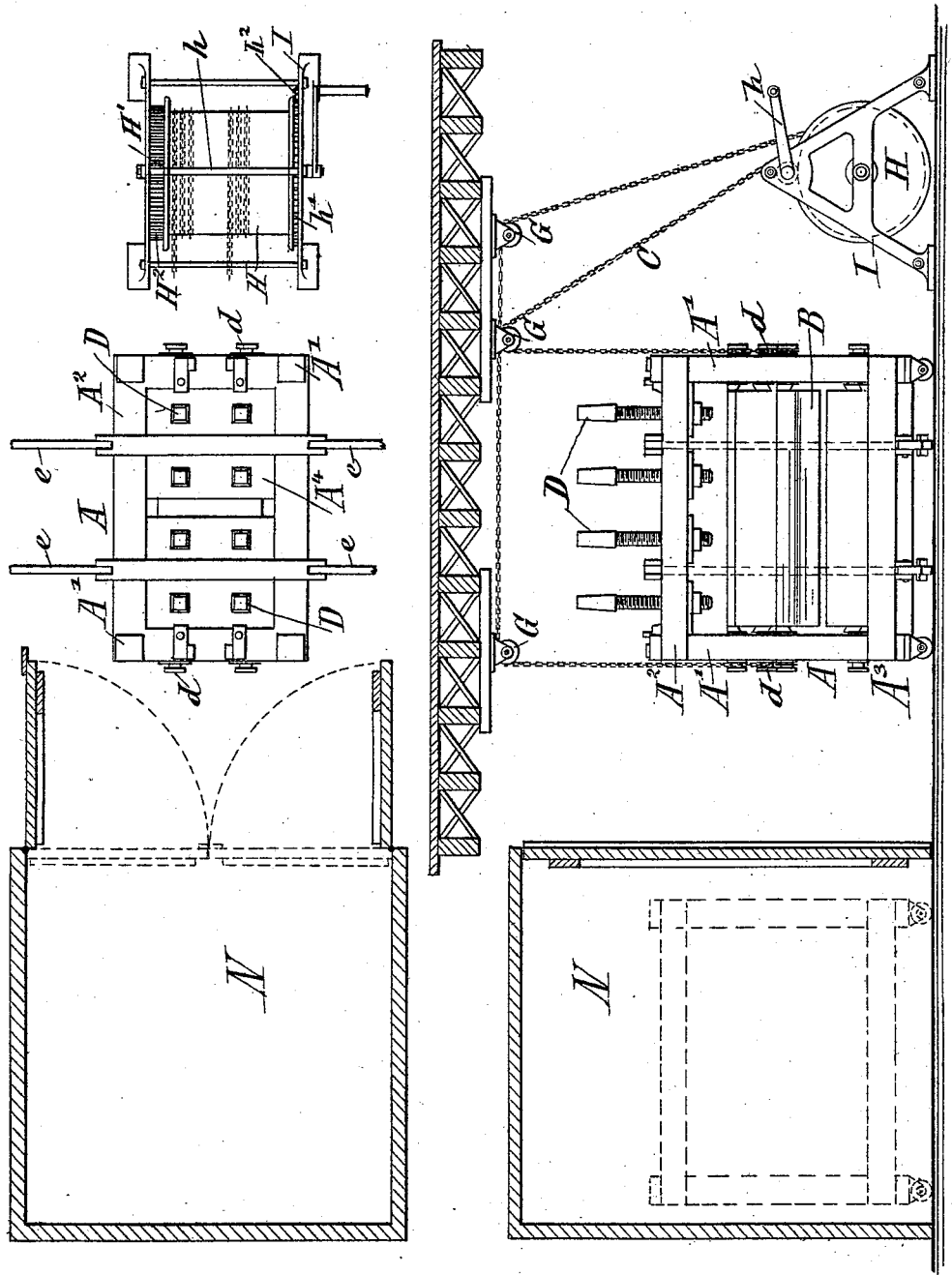

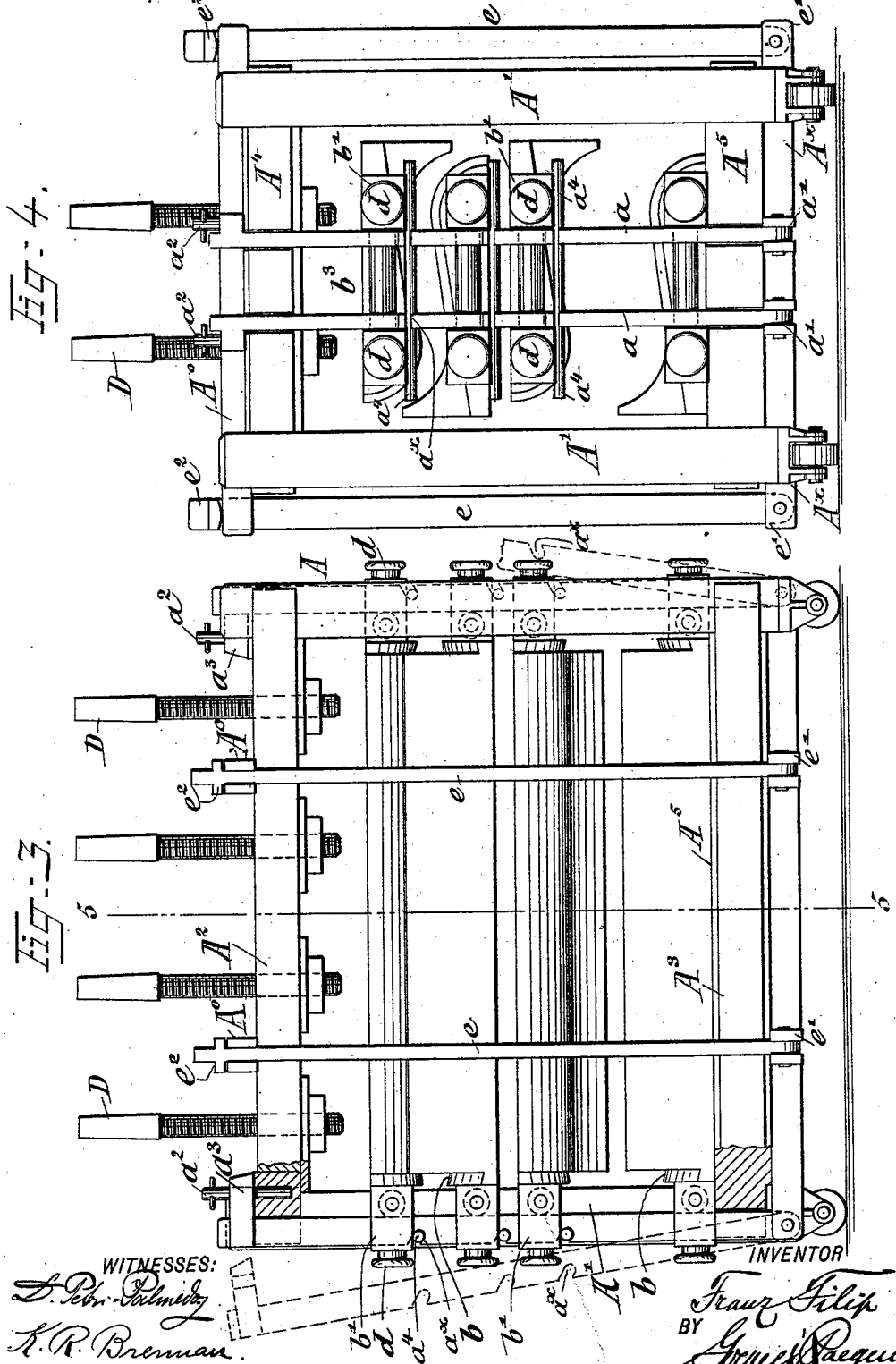

UNITED STATES PATENT OFFICE.

FRANZ FILIP, OF NEW YORK, N. Y.

APPARATUS FOR MOLDING VENEER ARTICLES.

SPECIFICATION forming part of Letters Patent No. 528,663, dated November 6, 1894.

Application filed February 9, 1894. Serial No. 499,652. (No model.)

*To all whom it may concern:*

Be it known that I, FRANZ FILIP, a citizen of the Austro-Hungarian Empire, residing in the city, county, and State of New York, have invented certain new and useful Improvements in Apparatus for Molding Veneer Articles, of which the following is a specification.

This invention has reference to an improved apparatus for molding veneer articles of large size, such as piano-lids and similar articles, in such a manner that the molding is accomplished very effectively and superiorly by the employment of cast-iron molds of considerable strength and firmness, so that articles composed of a number of layers of veneers can be produced in a quicker and cheaper manner than by the crude appliances heretofore in use; and the invention consists of an apparatus for molding articles of veneer, which comprises cast-iron mold-sections arranged in pairs, a suitable frame for supporting the same, said frame being provided with guide-rails for the mold-sections, means for lifting or lowering the individual mold-sections so as to permit the insertion of the veneer article to be pressed into shape, means for supporting the mold-sections in raised position on the guide-rails, and means for clamping the mold-sections together, ready for steaming, after all the articles to be formed are inserted into the mold-sections.

The invention consists further of certain details of construction by which the operation of the apparatus is expedited and facilitated, as will be fully described hereinafter and finally pointed out in the claims.

In the accompanying drawings, Figure 1 represents a plan view of my improved apparatus for forming veneer articles. Fig. 2 is a side elevation of the same, partly in section through the steaming-apparatus. Fig. 3 is a side elevation of the molding-apparatus, drawn on a larger scale, with parts shown in section. Fig. 4 is an end elevation of Fig. 3, showing some of the mold-sections supported in raised position ready to receive the articles to be pressed. Fig. 5 is a vertical transverse section on line 5—5, Fig. 3. Fig. 6 is a detailed vertical transverse section on line 6—6, Fig. 5, through one of the molds, and Fig. 7 is a perspective view of one of the mold-sections, shown detached from the apparatus.

Similar letters of reference indicate corresponding parts.

Referring to the drawings, A represents the frame of my improved apparatus for molding large articles of veneer.

B, B, are a number of mold-sections which are arranged in pairs, two sections forming a complete mold, and the working faces of which correspond to the shape of the article to be pressed.

The mold-sections B, B, are made of cast-iron or other suitable cast-metal, and of sufficient strength to resist the pressure to which they are subjected in shaping the veneer articles. Each mold-section is provided at both ends with a shoulder or ledge $b$ which extends from side to side and is slightly beveled, said ledge serving as a trough for receiving the glue or other liquid matter pressed out from the veneer articles, so as to retain the same and prevent it from hardening at the edges of the mold-sections. To the ends of each mold-section B are attached square blocks $b'$, which may be cast integral with the same and which are connected laterally by a rod $b^2$, on which is placed a sleeve or roller $b^3$, by which the mold-sections are guided along vertical guide-rails $a$ of the supporting-frame A of the apparatus, as shown in Fig. 4. To the outer faces of the blocks $b'$ are applied headed studs $d$, to which are attached the chains or wire cables C that are used for lifting the heavy mold-sections preparatory to inserting the veneer articles to be molded.

The chains or cables C are conducted over guide-pulleys G attached to the ceiling or other suitable support, to a hoisting-drum H which is operated by a crank-shaft $h$ and a pinion and gear-wheel transmission H', H², between the crank-shaft and the drum, as shown in Figs. 1 and 2. On the shaft of the drum is arranged a ratchet-wheel $h'$, which is engaged by a pawl $h^2$ on the supporting-frame I of the hoisting-device, so that when the drum is turned the pawl and ratchet-mechanism produce the arresting of the drum as the hoisting operation proceeds.

The supporting-frame A of my improved veneer molding apparatus is composed of strong upright corner-pieces A', which are connected by longitudinal top and bottom pieces A², A³ respectively, that are firmly connected together in any approved manner. The supporting-frame A is provided with a heavy top and bottom A⁴, A⁵, between which the mold-sections B, B, are clamped when the veneer articles are inserted between the same for being pressed. Through the top-plate $A^4$ of the supporting-frame A are passed clamping-screws D, which pass through interiorly-threaded reinforcing-plates, which are applied to the under side of the top-plate or plates, said clamping-screws being adapted to be operated by suitable key-levers that are applied to the square upper ends of the same.

The vertical guide-rails $a$ arranged at the ends of the supporting-frame are pivoted at their lower ends to ears $a'$, $a'$ of the bottom piece or plate $A^5$ of the frame and locked at their upper ends in recesses of the top-piece $A^4$ by means of fastening-pins $a^2$ that engage perforated lugs $a^3$ at the upper ends of the rail $a$, as shown in Figs. 3 and 4. The rails are provided at their outer edges with downwardly-inclined recesses $a^\times$ for supporting transverse rods $a^4$ which serve for supporting the mold-sections after the same are lifted by the hoisting-device, so that one article of veneer after the other can be inserted from the side of the supporting-frame between each pair of mold-sections, the supporting-rods taking up the weight of the mold-sections so as to relieve the hoisting-chains from the strain. To the sides of the supporting-frame A are also applied vertical brace-rods $e$, which are pivoted at their lower ends to lugs $e'$ of the bottom cross-pieces $A^\times$ of the supporting-frame A, and which are locked into the recessed ends of the top cross-pieces $A^0$ by their T-shaped heads $e^2$, the cross-pieces of which are beveled or rounded-off at their lower side, as shown in Fig. 4, so as to pass readily over the ends of the cross-pieces and take up the side-strain on the supporting-frame.

The working faces of the mold-sections correspond to the size and shape of the articles to be molded, and the size of the supporting-frame to the number of pairs of mold-sections that can be superposed above each other in the same. Ordinarily, each apparatus may be arranged with say three or four pairs of mold-sections, which remain permanently in the supporting-frame, but of which one or more pairs may be removed by lowering the end-rails $a$ and the side-braces $e$ so that the molds can be removed out of the open side of the supporting-frame A.

Operation: The articles of veneer to be molded by my improved apparatus are to be treated as follows: The individual layers of veneer of which the articles to be pressed are composed are first moistened and pressed into proper shape in suitable molds. After the individual layers have assumed the required shape, they are glued together one over the other until the required thickness of the article to be produced is obtained. The glued layers of the required thickness are then inserted into the press between two adjacent mold-sections, which is accomplished in the following manner: The brace-rods $e$ at one side of the supporting-frame are placed in lowered position, as shown in Fig. 1, and all the mold-sections, commencing with the uppermost, are raised by the hoisting apparatus until they can be individually supported by the transverse rods $a^4$ which are placed in notches of the guide-rails $a$, as shown in Fig. 4. When all of the superposed mold-sections are in this position, a sufficient space is obtained between the lowermost mold-section and its mate, so that the glued layers of veneers can be interposed from the open side and placed in position on the lowermost mold-sections. The complementary mold-section can then be lowered by the hoisting-apparatus, by first removing the transverse supporting-rods until it arrives on the glued article of veneer. The next mold-section is then lowered by the hoisting apparatus as before, until it rests on the second mold-section, sufficient space being thus formed between it and its mate to introduce the next article of veneer which is composed of the required number of layers glued together. The second mold-section belonging to this article of veneer is then lowered, and another article composed of glued veneers introduced between the next two mold-sections, and so on until every pair of mold-sections is provided with an article formed of a number of layers of veneer. The side brace-rods $e$ are then raised and locked at their upper ends to the cross-beams, and the clamping-screws are then turned in downward direction, so as to firmly press the different mold-sections and the articles of veneer between the same, as shown in Fig. 5. The hoisting-chains C are then lifted so as to be out of the way of the apparatus, so that the same can be removed on suitable rollers applied to the bottom frame of the same into a steaming-box N of the usual construction, in which the veneer articles are subjected to steaming, so that they permanently retain the shape into which they are molded. By the heat in the steaming-box the glue is dried, so that it sets. The apparatus remains in the steaming-box for a certain length of time according to the size and thickness of the articles. The apparatus is then removed from the steaming-box and the articles of veneer removed from between the mold-sections by reversing the operation before described, namely, by first lifting the uppermost mold-section by means of the hoisting device, which is accomplished by placing the chains around the headed studs $d$ of the mold-section and lifting it by means of the hoisting-drum, until the same can be supported on the transverse rods $a^4$ placed in the notches of the upright guide-rail $a$. The veneer article is then removed from the lower mold-section and the latter then lifted in the same manner as the first mold-section so that it can be supported by its transverse rods. The next mold-section is then lifted in the same manner, and the article of veneer on its mate removed, and so on until all the veneer articles are removed from the press. The different molds are then in the position shown in Fig. 4, and are ready to be charged again with new articles of veneer. The mold-sections retain the heat, so that the operation of drying and molding the articles is thereby accelerated. After the different mold-sections are again charged with articles of veneer, the entire apparatus is placed in the steaming-box and subjected to the action of steam, as before described. When the articles of veneer are removed from the mold-sections, they are subjected to a drying operation by being placed in suitable wooden clamping molds of corresponding section, so that they retain their shape. After drying they are ready to be further treated until the article is completed.

My improved apparatus for molding articles of veneer is adapted for shaping the lids or fall-boards of pianos or organs, or any other article which is made of a number of glued superposed veneers; also large-sized moldings for piano-cases, or articles or furniture. Whatever the article or its shape, the mold-sections have to correspond in shape and size to the same, and are preferably made of cast-iron, so that they form durable and permanent molds for articles of veneer, which cannot deteriorate and which produce for any length of time articles of exactly the same shape and perfection.

By the apparatus described, veneer articles, especially those of larger size, can be made in less time and at less expense than with the crude molds heretofore in use, which were usually made of wood and which soon became warped and inaccurate.

Having thus described my invention, I claim as new and desire to secure by Letters Patent—

1. An apparatus for molding veneer-articles, the same consisting of a supporting-frame, vertical movable guide-rails applied to the frame, a number of superposed removable mold-sections supported in said frame, and provided with means for guiding them on said rails, means for supporting the individual mold-sections in raised position on the guide-rails, and means for clamping the mold-sections together after the veneer articles are inserted between them, substantially as set forth.

2. An apparatus for molding veneer-articles, the same consisting of a supporting-frame, vertical guide-rails applied to the frame, a number of superposed mold-sections supported by said frame and provided with means for guiding them on said rails, removable transverse rods applied to said guide-rails for supporting the individual mold-sections in raised position for inserting the articles of veneer between the mold-sections, and means for clamping the mold-sections together after the veneer articles are inserted between them, substantially as set forth.

3. An apparatus for molding veneer-articles, the same consisting of a supporting-frame, vertical guide-rails hinged to the frame, a number of superposed removable mold-sections supported in said frame, and provided with means for guiding them on said rails, removable transverse rods applied to said guide-rails for supporting the individual mold-sections in raised position to receive the articles of veneer between them, and means for clamping the mold-sections together after the veneer articles are inserted between them, substantially as set forth.

4. An apparatus for molding veneer-articles, the same consisting of a supporting-frame, brace-rods hinged to the sides of said frame, guide-rails hinged to the ends of the frame, a number of superposed mold-sections supported in said frame, means for supporting the individual mold-sections in raised position on the guide-rails, and means for clamping the mold-sections together after the veneer articles are placed between them, substantially as set forth.

5. An apparatus for molding veneer-articles, the same consisting of a supporting-frame, movable guide-rails applied to the ends of the frame, a number of superposed mold-sections supported in the said frame, projecting blocks on the ends of the mold-sections guided upon said guide-rails, headed studs on said blocks, hoisting mechanism provided with suitable chains adapted to be passed around said studs, and means for clamping said mold-sections together upon the articles of veneer, substantially as set forth.

6. The combination of a supporting-frame formed of top and bottom plates and upright corner-pieces, hinged brace-rods applied to the sides of the supporting-frame, upright guide-rails attached to the ends of the same, a number of mold-sections supported by the frame and provided with guide-blocks at the ends, having headed studs, guide-rollers supported by the said blocks, for moving along the guide-rails, and transverse rods which are supported in notches of the guide-rails for supporting the individual mold-sections in raised position for inserting the articles of veneer between the mold-sections, substantially as set forth.

7. A mold-section made of cast-metal, corresponding to the shape of the article to be molded, the mold-section being provided with a beveled shoulder or ledge at each end, substantially as set forth.

8. A mold-section made of cast-metal, corresponding to the shape of the article to be molded, the mold-section being provided with a beveled ledge or shoulder at each end, and with cast-metal blocks having headed studs at their outer ends, and transverse rollers between said blocks, substantially as set forth.

In testimony that I claim the foregoing as my invention I have signed my name in presence of two subscribing witnesses.

FRANZ FILIP.

Witnesses:
PAUL GOEPEL,
K. R. BRENNAN.